United States Patent
Al-Qasim

(10) Patent No.: US 11,828,138 B2
(45) Date of Patent: Nov. 28, 2023

(54) ENHANCED CARBON CAPTURE AND STORAGE

(71) Applicant: SAUDI ARABIAN OIL COMPANY, Dhahran (SA)

(72) Inventor: Abdulaziz S. Al-Qasim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/713,306

(22) Filed: Apr. 5, 2022

(65) Prior Publication Data

US 2023/0313645 A1  Oct. 5, 2023

(51) Int. Cl.
*E21B 41/00* (2006.01)
*E21B 49/00* (2006.01)
*C09K 8/84* (2006.01)

(52) U.S. Cl.
CPC .......... *E21B 41/0064* (2013.01); *C09K 8/845* (2013.01); *E21B 49/00* (2013.01); *C09K 2208/10* (2013.01)

(58) Field of Classification Search
CPC ................................................. E21B 41/0064
See application file for complete search history.

(56) References Cited

U.S. PATENT DOCUMENTS 8,899,331 B2  12/2014  Burnham et al.
9,834,381 B2  12/2017  Wang et al.
(Continued)

FOREIGN PATENT DOCUMENTS

KR  20150012910 A  2/2015
WO  2010109340 A2  9/2010
(Continued)

OTHER PUBLICATIONS

Matter, Juerg, et al. "Rapid carbon mineralization for permanent disposal of anthropogenic carbon dioxide emissions", Science. Jun. 10, 2016, pp. 1-26 [27 Pages].
(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A well system is provided that includes an injection wellbore having a configuration that traverses an injection formation and has a horizontal configuration. The injection wellbore also has a configuration such that a treatment fluid and a CO2 fluid may be introduced into the injection wellbore and also selectively introduced into a treatment zone. The treatment fluid comprises water and basalt nanoparticles. The injection wellbore has a configuration such that the treatment zone is positioned in a horizontal portion of the injection wellbore. Each treatment zone includes a treatment unit. The treatment unit is configured to selectively introduce a fluid into the treatment zone. The treatment zone is in fluid communication with the injection formation. A method for treating an injection formation includes introducing a treatment fluid into a well system as previously described, selectively introducing the treatment fluid into a treatment zone, and monitoring the injection formation.

17 Claims, 5 Drawing Sheets

(56) References Cited

U.S. PATENT DOCUMENTS

| | | |
|---|---|---|
| 10,569,956 B1 | 2/2020 | Keshner et al. |
| 2010/0170674 A1* | 7/2010 | Blount ................ E21B 41/0064 |
| | | 405/59 |
| 2011/0174507 A1* | 7/2011 | Burnham ............ E21B 41/0064 |
| | | 166/402 |
| 2014/0174732 A1* | 6/2014 | Goodwin ................ E21B 33/13 |
| | | 166/255.1 |
| 2014/0190691 A1 | 7/2014 | Vinegar et al. |
| 2017/0037716 A1* | 2/2017 | Kohlik ................ E21B 43/2401 |
| 2019/0187386 A1 | 6/2019 | Constantz et al. |

FOREIGN PATENT DOCUMENTS

| | | |
|---|---|---|
| WO | 2011102868 A1 | 8/2011 |
| WO | 2014053912 A1 | 4/2014 |

OTHER PUBLICATIONS

Gislason, Sigurdur, et al. "A brief history of CarbFix: Challenges and victories of the project's pilot phase", Energy Procedia. Sep. 2018, pp. 103-114 [12 Pages].

Adam, Ludmila, et al. "Co2 Sequestration in Basalt: Carbonate Mineralization and Fluid Substitution", SEG Annual Meeting 2011: SEG-2011-2108. Jan. 2011, pp. 1-6 [6 Pages].

\* cited by examiner

ENHANCED CARBON CAPTURE AND STORAGE

BACKGROUND

In traditional carbon capture and storage (CCS) technologies, pressurized carbon dioxide is injected into a formation under pressure. By doing this, the carbon dioxide pools in the upper portion of the formation that it is injected into as a gas, a buoyant liquid, or a supercritical fluid. In such systems, the cost of monitoring the formation for leaks is a not insignificant portion of its expense that must be maintained for years.

Recently, developments have occurred where mixtures of water and carbon dioxide are pressurized and injected into basalt formations. The carbon dioxide converts into carbonic acid underground, and in the presence of the basalt formation reacts with minerals in the basalt rock. The reaction products—slightly soluble carbonate species of calcium and magnesium—reside in the formation. The introduced carbon dioxide is chemically converted into a non-carbon dioxide specie. Such a technique does not require monitoring of the formation after introduction as the carbon dioxide is eliminated.

SUMMARY

In one or more aspects, a well system is provided. The well system comprises an injection wellbore. The injection wellbore has a configuration such that the injection wellbore traverses an injection formation and has a horizontal configuration. The injection wellbore also has a configuration such that a treatment fluid and a CO2 fluid may be introduced into the injection wellbore and also selectively introduced into a treatment zone. The treatment fluid comprises water and basalt nanoparticles. The injection wellbore has a configuration such that the treatment zone is positioned in a horizontal portion of the injection wellbore. Each treatment zone includes a treatment unit. The treatment unit is configured to selectively introduce a fluid into the treatment zone. The treatment zone is in fluid communication with the injection formation.

In one or more aspects, a method for treating an injection formation is provided.

The method of may include introducing a treatment fluid into a well system as previously described. The method of may include selectively introducing the treatment fluid into a treatment zone. The treatment fluid may comprise water and basalt nanoparticles. The method may include monitoring the injection formation.

Other aspects of the disclosure will be apparent from the following description and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

DETAILED DESCRIPTION

Figure 1:
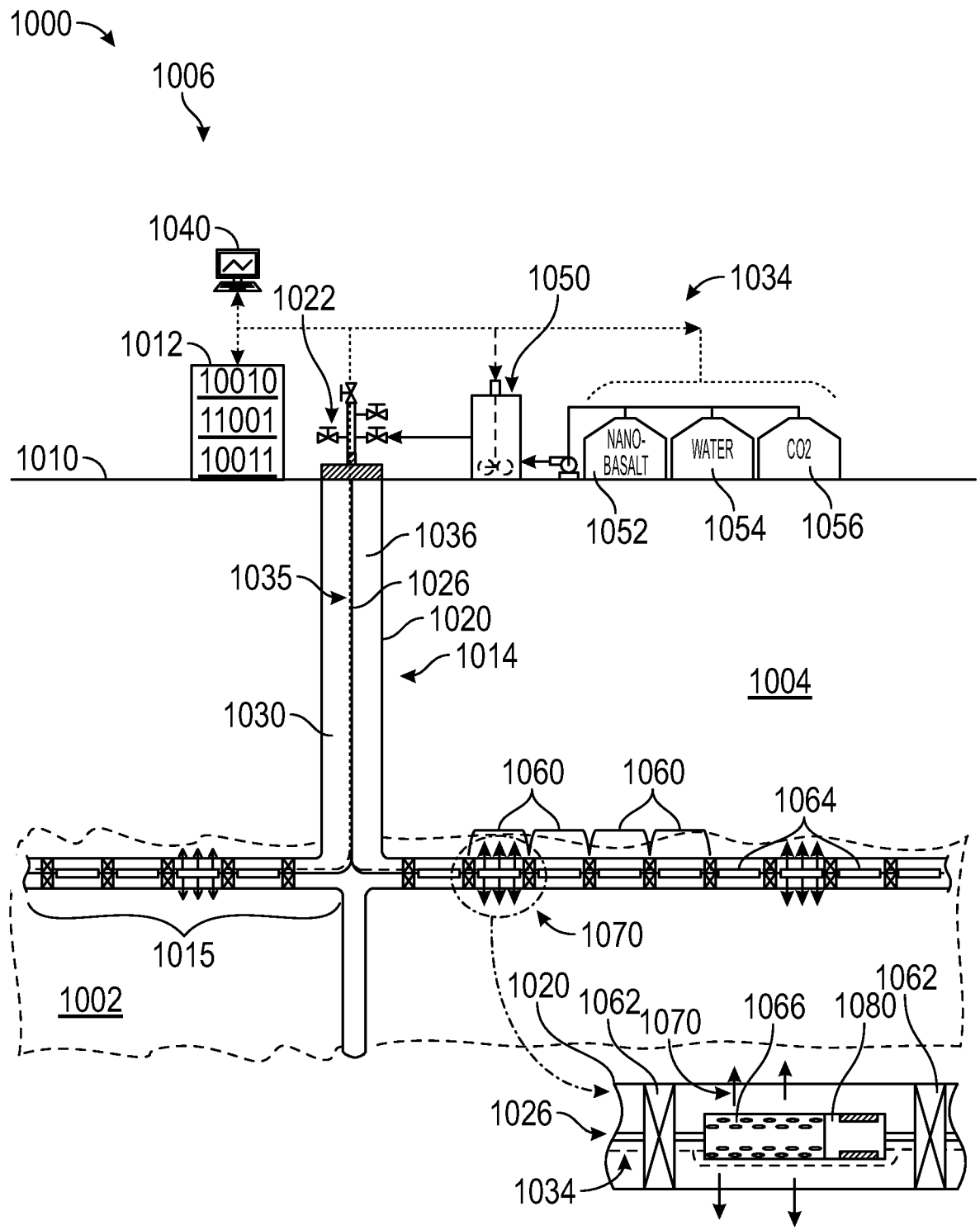
FIG. 1 is a diagram that illustrates a well environment with a first treatment system in accordance with one or more embodiment.

Specific embodiments of the disclosure will now be described in detail with reference to the accompanying figures. Like elements in the various figures are denoted by like reference numerals for consistency.

In the following Detailed Description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

A few problems exist with the basalt injection formation technique of chemically eliminating carbon dioxide. Many locations do not have basalt formations or at least easily accessible formations. Not all basalt formations are porous enough to accept the injection of fluids or do not have the quality to contain the fluids under pressure for a long enough period to permit conversion. As well, in natural conditions the reaction between aqueous carbonic acid and a portion of the basalt formation may take months, if not potentially, a year. Finally, there are many perfectly suitable formations for containing carbon dioxide that are not made of basalt but other materials that are not reactive to aqueous carbonic acid, for example, sandstone, limestone, and shale formations. Some are depleted hydrocarbon-bearing formations; others are low-pressure water formations; yet others are void of any fluid.

A system and method are proposed for improving subsurface carbon dioxide capture capability, especially for reservoirs that have less amounts of matrix material that is reactive with carbon dioxide. The proposed technology will make it feasible for countries lacking basaltic rock formations or without enough concentration of them to take advantage of the natural subsurface mineralization that may occur utilizing basaltic formations with aqueous solutions of carbon dioxide.

The technology is based on the introduction of a base fluid with basalt nanoparticles into a target formation for storage. Upon introduction of aqueous carbon dioxide, the acid reaction with the basalt nanoparticles triggers a subsurface mineralization process. The basalt may be derived from natural basalts rocks or made using artificial rocks with similar properties to basalts. Impregnating a target non-basaltic formation with nanoparticle basalt material induces reactivity that captures carbon dioxide, and the nanoparticle size enhance the mineralization reaction. The process is flexible and can effectively utilize any source of water that supports carbonic acid formation in underground formations that are under pressure and elevated temperature.

Treatment Systems

FIG. 1 is a diagram that illustrates a well environment with a treatment system in accordance with one or more embodiments. In FIG. 1, the well environment 1000 includes an injection formation 1002 located among the subsurface formations 1004. Well system 1006 is shown traversing the subsurface formations 1004 and is in fluid communication with injection formation 1002 via injection wellbore 1014.

Subsurface formations 1004 may include one or more porous or fractured rock formation that resides beneath the surface 1010. Well environment 1000 include surface 1010, which represents the surface of the earth. Surface 1010 may be located above water, under water, or under ice. Well system 1006 may have been previously formed for the purposes of developing a hydrocarbon well, such as an oil well, a gas well, a gas condensate well, a mixture thereof, or another type of well, such as a fresh, brine, or mineral water well. Well system 1006 may have been formed for the purposes of fluidly accessing injection formation 1002. The subsurface formations 1004 and the injection formation 1002 may each have heterogeneity with varying characteristics, such as degree of density, permeability, porosity, pressure, temperature, and fluid saturations of the rock within each formation.

The well system 1006 may include an injection wellbore 1014 and a well control system (or "control system") 1012. The control system 1012 may regulate various operations of the well system 1006, such as well and formation monitoring operations.

The injection wellbore 1014 may include a bored hole that extends from the surface 1010 into the subsurface formations 1004 such that fluid communication is established with the injection formation 1002. Injection wellbore 1014 is a void that is defined by wellbore wall 1020.

In one or more embodiments, the well system 1006 includes a wellhead 1022 that supports, couples to, and provides surface access to an injection line 1026. The injection line 1026 may be comprised of drill pipe, coiled tubing, fixed tubing, or other forms of fluid conduit for conveying fluids between the surface 1010 and the injection formation 1002. The wellbore annulus 1030 is the void of the injection wellbore 1014 between the injection line 1026 and the wellbore wall 1020. The wellhead also supports, couples to, and provides surface access to a signal and power line 1034 (dotted line), which provides both signal communication between units downhole and the control systems utilizing a computer processor on the surface and power to operate the units downhole. The wellbore annulus 1030 is filled with a completion fluid 1036 to maintain structural integrity of the injection wellbore 1014 and to protect the lines and objects thermally and chemically in the injection wellbore 1014.

A number of support systems are provided on the surface for the well system. In one or more embodiments, a well control system 1012 may use information obtained from the operations of the well system 1006 in conjunction with a set of pre-determined instructions and algorithms retained in a memory of a computer system to maintain or modify operations of operable units within the well system 1006. For example, ratios of mixing the components of the treatment fluid, introduction of the treatment fluid and the CO2 fluid into the wellbore, and determining the progress of the reaction in the injection formation may all be handled by the well control system 1012. In FIG. 1, command signals for maintaining or modifying operations of portions of the well system 1006, such as units within injection wellbore 1014 may be transmitted downhole from well control system 1012 via a signal and power line 1035 (dotted line). The well control system 1012 may also maintain or modify operations of the surface systems and unit. Control signal lines 1034 may interlink the well control system 1012 with units such as the drive motor and outlet control valve of the surface slurry mixer 1050, and control flow valves for the basalt nanoparticle storage tank 1052, the water storage tank 1054, and the CO2 storage tank 1056.

The well control system 1012 may be coupled to a control terminal 1040. The well control system may relay information for viewing by an external viewer. The information may be numerically displayed, graphically displayed, or both. An external viewer may include a computer monitor, a television, a printer, or any other form of temporal or permanent version of record keeping, communicating, and displaying that may be visually and audibly appreciated.

In addition to the control system, a number of units on the surface are utilized to create and distribute the treatment fluid and the CO2 fluid. In FIG. 1, three tanks are provided: the basalt nanoparticle storage tank 1052, the water storage tank 1054, and the CO2 storage tank 1056. The basalt nanoparticle storage tank contains an amount of nanoparticle-sized pieces of basalt or basalt-like material. Amounts of basalt nanoparticle, water, and optionally gaseous, critical, or supercritical carbon dioxide are combined to form the treatment fluid. For the embodiment shown in FIG. 1, the treatment fluid comprises all three components mixed together into a slurry in surface slurry mixer 1050 before introduction into the injection wellbore 1014 as a combine fluid. For the purpose of this application, a "fluid" also includes slurries and solutions.

In the one of several horizontal portions 1015 of the injection wellbore 1014, the well system further comprises one or more treatment zones 1060. In the inset of FIG. 1, an image of a closer view of a treatment zone 1060 is provided. The treatment zone 1060 comprises a fluidly isolated portion of the wellbore annulus 1030 within a horizontal portion 1015 of injection wellbore 1014. The isolated portion of the wellbore annulus 1030 is located in between two annular isolation packers 1062: one positioned uphole and one downhole. The annular isolation packers 1062 frictionally couple with the wellbore wall 1020 and the injection line 1026 so that no fluid may bypass in between. Treatment zone 1060 is in fluid communication with the injection formation 1002.

For well system 1006 in FIG. 1, a treatment unit 1064 is positioned in between the two annular isolation packers 1062. The treatment unit 1064 is in fluid communication with the surface slurry mixer 1050 using injection line 1026. The injection line 1026 passes treatment fluid 1070 into the treatment zone 1060 from the upstream annular isolation packer 1062 downhole and then out of the treatment zone 1060 through the downstream annular isolation packer 1062. Treatment unit 1064 is also in signal communication with the well control system 1016, which may utilize a computer processor, using signal and power line 1035. The signal and power line 1035 passes both signal communications both uphole and downhole through the treatment zone 1060 and passes power downhole.

The treatment unit 1064 is shown in part comprising an inflow and injection control device (IICD) 1066. The IICD 1066 is configured to selectively introduce treatment fluid 1070 into the isolated wellbore annulus 1030 within the treatment zone 1060 and further into the injection formation 1002. The IICD 1066 is show in an open state that is introducing (arrows) treatment fluid 1070.

In the instance shown in FIG. 1, treatment unit 1064 is also shown in part comprising a sensor package 1080. The sensor package 1080 may comprise one or more sensors configured for detecting a condition within the treatment zone or the injection formation.

Figure 2:
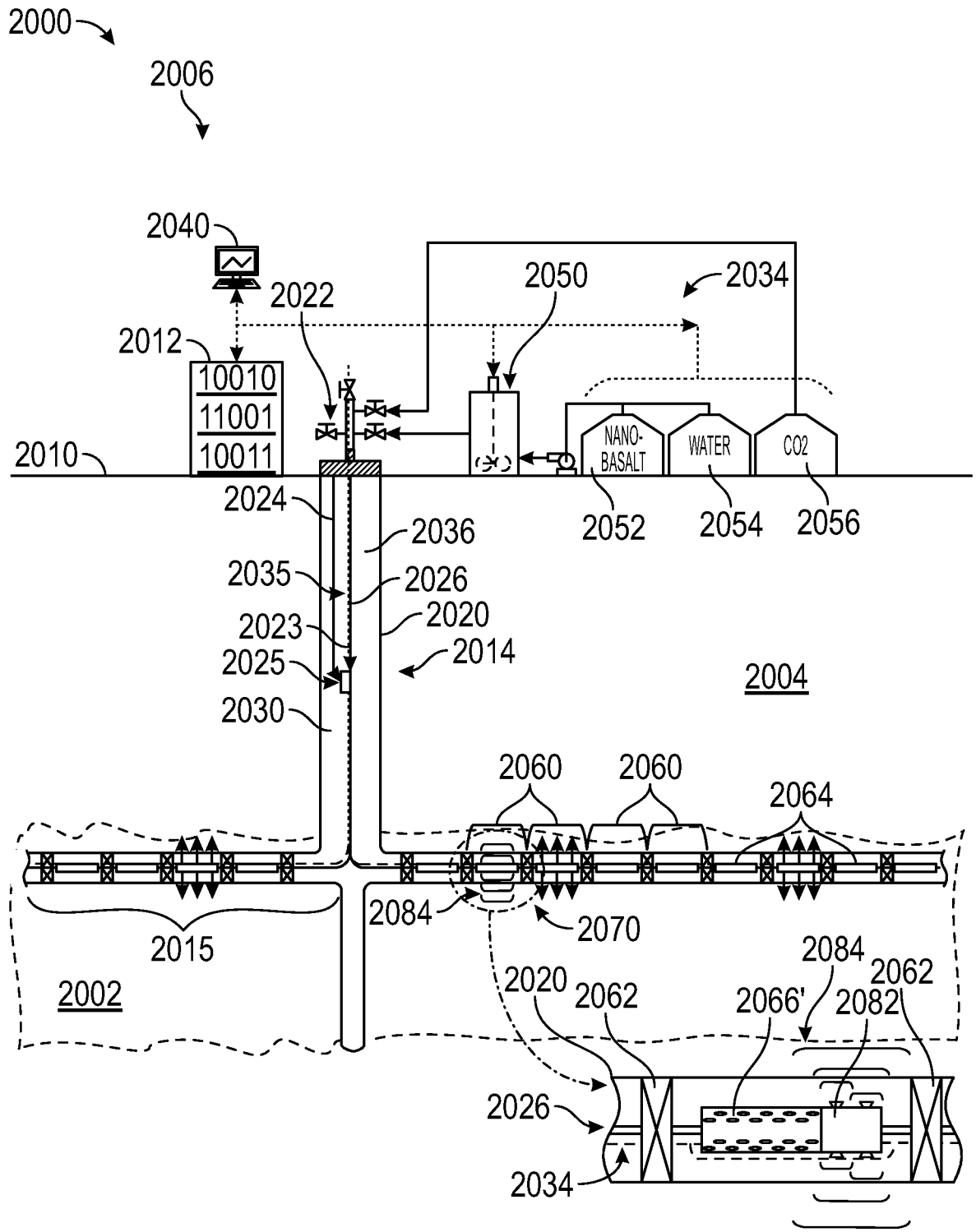
FIG. 2 is a diagram that illustrates a second well environment with a treatment system in accordance with one or more embodiment.

FIG. 2 is a diagram that illustrates a second well environment with a treatment system in accordance with one or more embodiments. In FIG. 2, the well environment 2000 has a similar configuration and elements as provided in FIG. 1 and its described well environment 1000; however, several differences are noted forthcoming. As previously indicated, like numbers reflect like elements with like attributes.

On the surface 2010, a change in the configuration of the storage tanks is noted for well system 2006. In FIG. 2, it is shown that a supply line coupled to the CO2 storage tank is not directly coupled to the surface slurry mixer 2050. Rather, the CO2 storage tank 2056 is in physically coupled with the wellhead 2022 at a separate attachment point than the surface slurry mixer 2050. This indicate in this instance that the treatment fluid at the surface fabricated and introduced into the injection wellbore comprises solid basalt nanoparticle and water but not CO2 fluid.

In the injection wellbore 2014, the CO2 storage tank 2056 is in fluid communication with a second injection line 2024. The second injection line 2024 runs downhole from the wellhead 2022 and fluidly couples to a downhole sparger 2025. The surface slurry mixer 2050 is in fluid communication with a first injection line 2023. The first injection line 2023 runs downhole from the wellhead 2022 and fluidly couples to the downhole sparger 2025.

The downhole sparger 2025 is configured such that it is positioned as part of the first injection line 2023, that is, the CO2 fluid is introduced into the treatment fluid. Coupled to and downhole of the downhole sparger 2025, a single injection line 2026 provides the treatment fluid—now comprising at least solid basalt nanoparticle, water, and carbon dioxide—to the various treatment zones 2060 in the horizontal portions 2015 of the injection wellbore 2014.

In the horizontal portions 2015 of the injection wellbore 2014 in FIG. 2, the treatment zones 2060 are shown containing treatment units 2064. In the inset of FIG. 2, the treatment unit 2064 is shown with an IICD 2066' that is in a close state, that is not distributing treatment fluid 2070 into the injection formation 2002; however, other treatment units 2064 in FIG. 2 are shown distributing the treatment fluid 2070 (arrows).

Also shown in the inset of FIG. 2 is that the treatment unit 2064 also has an acoustic package 2082. The acoustic package 2082 is shown transmitting (curves) acoustic waves 2084 into the injection formation 2002.

Figure 3:
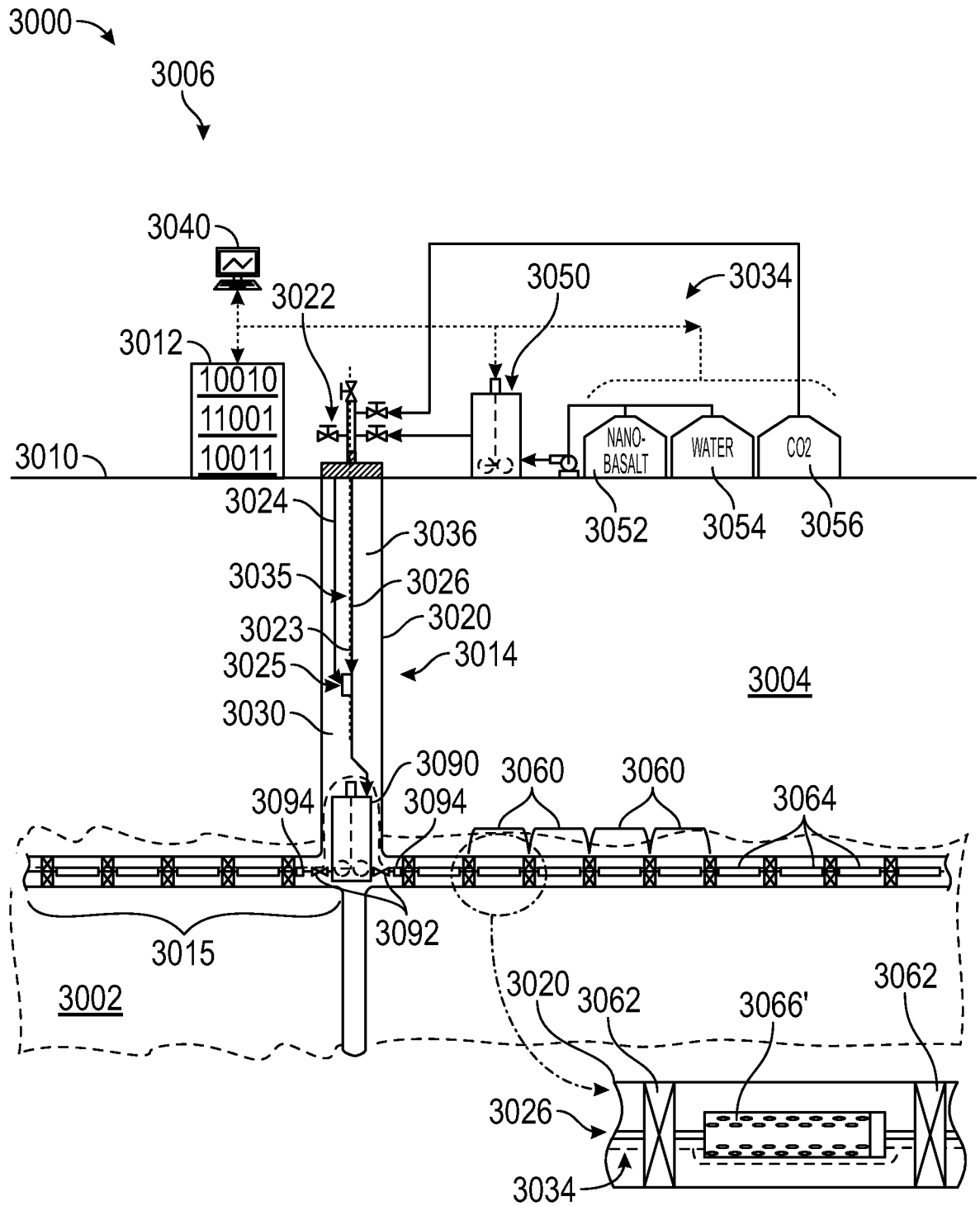
FIG. 3 is a diagram that illustrates a third well environment with a treatment system in accordance with one or more embodiment.

FIG. 3 is a diagram that illustrates a third well environment with a treatment system in accordance with one or more embodiments. In FIG. 3, the well environment 3000 has a similar configuration and elements as provided in both FIGS. 1 and 2, and their described well environments 1000 and 2000, respectively. However, as one of ordinary skill may recognize in comparing the images, several differences are noted as will be described. As previously indicated, like numbers reflect like elements with like attributes.

A difference in well environment 3000 is that at the "T" between the horizontal portion 3015 of the wellbore and the mother wellbore there is a downhole batch reactor 3090. The purpose of this reactor is to "remix" the carbon dioxide, which is at critical or supercritical conditions, the water, and the basalt nanoparticles, proximate to where the mixture is about to be introduced into the injection formation 3002. The downhole batch reactor is shown fluidly coupled to the injection line 3026, where it receives the ingredients to be mixed. The downhole batch reactor 3090 is also shown signally and electrically coupled to the signal and power line 3035 such that both surface power and control signals may be utilized to operate the downhole batch reactor 3090.

Another difference is the direct incorporation of non-treatment zone flow control and downhole pumping systems. Downhole of the batch reactor 3090 are shown two inflow control valves (ICVs) 3092 and inverted electrical submersible pumps (ESPs) 3094. The ICVs 3092 may be utilized to selectively regulate where the contents of the batch reactor 3090 are discharged into—no horizontal lateral, one of the two horizontal laterals, or both simultaneously. The inverted ESPs 3094, upon activation, not only draw fluid from the batch reactor 3090 upon completion of mixing but in doing so pull fresh fluid, including critical or supercritical carbon dioxide, water, and nanoparticle basalt, into the batch reactor 3094. As well, the inverted ESPs 3092 drive the newly mixed fluid into any treatment zones 3064 that may be in selective communication with their respective treatment zones 3066. Upon filling the batch reactor 3090, the inverted ESPs 3094 may be deactivated. Both the ICVs and the inverted ESPs are coupled to signal and power line 3035 not only to receive power for activation and deactivation but also to communicate activation status.

While the components of the downhole batch reactor 3090 are being mixed, injection is not occurring; hence, the injection ICD 3066' is shown in a closed state. When the contents of the downhole batch reactor 3090 are introduced to the injection ICDs, their state will change to open (3066; not shown).

Figure 4:
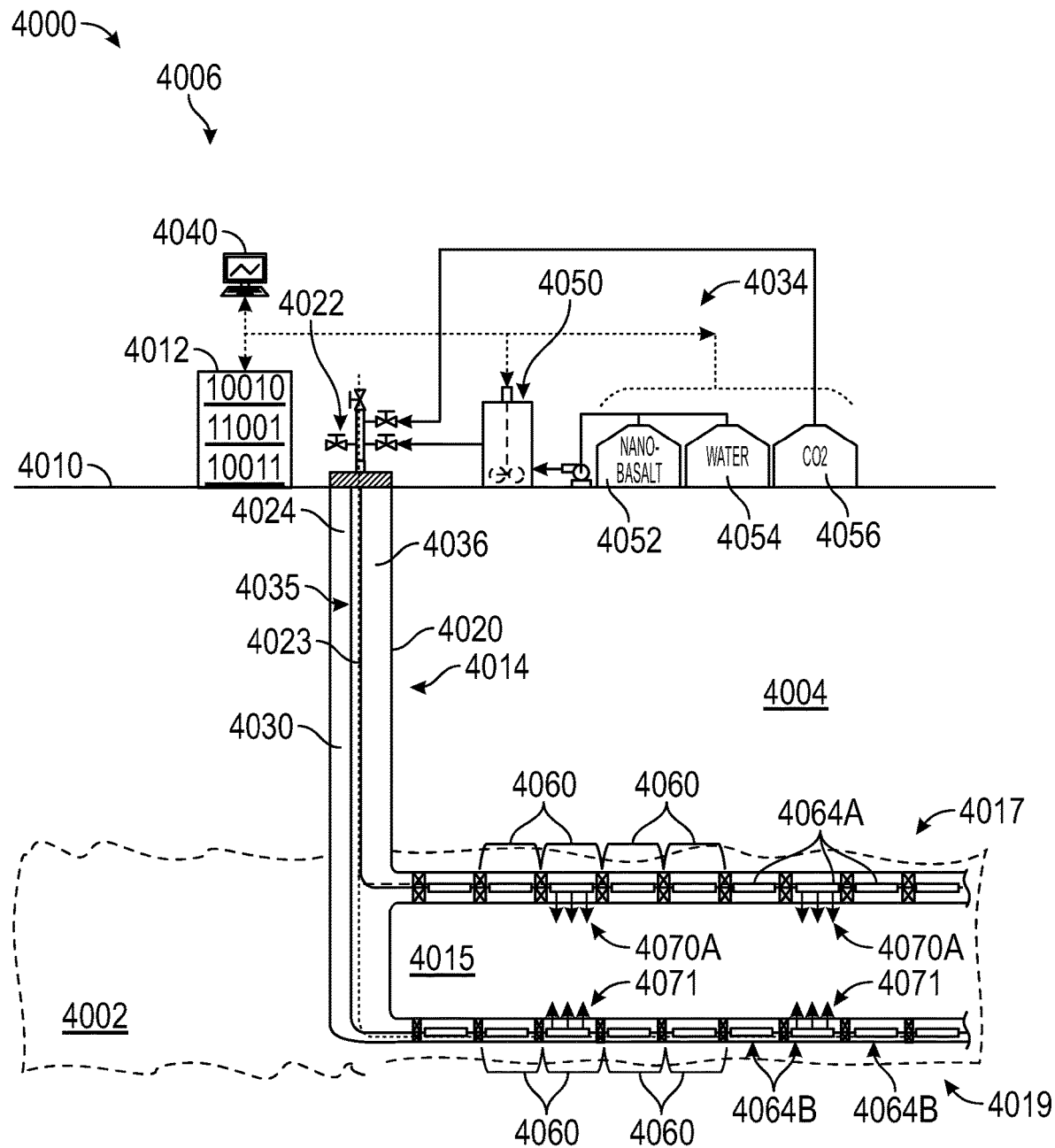
FIG. 4 is a diagram that illustrates a fourth well environment with a treatment system in accordance with one or more embodiment.

FIG. 4 is a diagram that illustrates a fourth well environment with a treatment system in accordance with one or more embodiments. In FIG. 4, the well environment 4000 has a similar configuration and elements as provided in FIGS. 1, 2, and 3, and their described well environments 1000, 2000, and 3000, respectively. One of ordinary skill should be able to recognize similar and dissimilar attributes when comparing the figures and reading the descriptions. The several differences are noted and will be described. As previously indicated, like numbers reflect like elements with like attributes.

Well system 4006 is shown with a similar surface configuration as well system 2006 in that the CO2 fluid and the treatment fluid are separately introduced into the injection wellbore 4014. Downhole from the wellhead 4022, the second injection line 4024 and the first injection line 4023 remain separate as they both traverse down hole towards the horizontal portions 4015 of the injection wellbore 4014.

Unlike with previously described well environments that are configured as multi-lateral, injection wellbore 4014 is shown as a multi-level wellbore. There is an upper lateral 4017 positioned near the top and a lower lateral 4019 positioned near the bottom of the injection formation 4002. First injection line 4023 is routed through the upper lateral 4017 and the CO2 supply line is routed thought the lower lateral 4019. The treatment fluid 4070A, comprising at least basalt nanoparticle and water but not CO2 fluid, does not combine with the CO2 fluid 4071 in the injection wellbore; rather, the two fluids combine within the injection formation 4002.

The configuration of the well system 4006 is to exploit the relative buoyancies of both fluids such that the treatment fluid migrates downwards into the injection formation and the CO2 fluid migrates upwards into the injection formation.

Upon meeting, the two fluids will intimately intermingle, the reaction of carbonic acid with the basalt nanoparticle will occur, and the slightly soluble solids will form within the formation. Introduction from two different wellbores of the reactive components also allows deeper migration into the target formation and therefore better exploitation of the available pore space.

The configuration of the treatment units for the well system in well environment 4000 may be different from those described previously for well environments. For example, there may be configuration differences in the IICDs present in the treatment zones 4060 of the upper lateral 4017 versus the lower lateral 4019. The first treatment units 4064A in the upper lateral 4017 may be configured to distribute only a slurry-type treatment fluid 4070A, which does not contain any CO2 fluid. As well, the first treatment units 4064A may also be configured such that the treatment fluid 4070A is directed downward (arrows) and not in all directions. Similarly, the second treatment units 4064B in the lower lateral 4019 may be similarly configured for utilization with the CO2 fluid 4071, including upwardly directing (arrows) the introduction of the CO2 fluid 4071.

Treatment Fluid

In one or more embodiments, a treatment fluid is introduced into the injection well. The treatment fluid is introduced into the injection formation such that it may convey solid basalt nanoparticle into the injection formation, where carbonic acid may react with the components of the basalt or basalt-like material and form slightly soluble solids that drop out of the aqueous solution and are retained in the injection formation permanently.

In one or more embodiments, the treatment fluid comprises water. Water may comprise one or more known compositions of water, including distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; boiler feed water; condensate water; and combinations thereof. The water may include impurities, including, but not limited to, ions, salts, minerals, polymers, organic chemicals, inorganic chemicals, detritus, flotsam, debris, and dead and living biological life forms, so long as the purpose and performance of the surfactant solution is not mitigated or otherwise detrimentally affected.

In one or more embodiments, the water may have an aqueous concentration of calcium, magnesium, barium, or iron divalent cations. The calcium, magnesium, or iron divalent cations may be provided from a natural mineral source, such as from a mineral water, sea water, or utility water, or from an addition of a source of ions, such as a salt. In one or more embodiments, a salt is included with the water introduced into the injection formation selected from the group comprising iron chloride, calcium chloride, magnesium chloride, barium chloride, and combinations thereof.

Although not wanting to be bound by theory, the time to precipitate carbonates depends on such factors as, but not limited to, the available divalent metal cations, which is proportional to the dissolution rate of the mineral, fluid temperature and pressure, solution composition, carbon dioxide saturation, and pore surface area. It is believed that the presence of non-divalent cations may lower the rate of reactivity with the basalt nanoparticle.

In one or more embodiments, the treatment fluid also comprises basalt nanoparticle, which are solid nanometer scale sized particles containing or comprising basalt.

Basalt is an aphanitic extrusive igneous rock formed from the rapid cooling of low-viscosity lava rich in magnesium and iron. For the purpose of this application, "basalt" is defined for this application as a naturally occurring rock, that is, a solid aggregate comprising minerals or mineraloids, such as mafic, ultramafic, or felsic rock.

The basalt rock may be reduced by chemical or physical means into nano-basalt particles that are useful for embodiment processes and systems. Rocks that comprise magnesium, calcium, or iron, for example, mafic, ultramafic, peridotite, basalt, gabbro, and diabase, may provide upon exposure to an aqueous acid, such as carbonic acid, divalent cations, such as $Mg^{+2}$, $Ca^{+2}$, or $Fe^{+2}$, for use in carbon sequestration. It is desirable to minimize carbon dioxide production, which would defeat the purpose of permanent carbon dioxide sequestration. See Equation 1:

$$(Mg/Ca/Fe)^{+2}{}_{(aq)} + CO_3^{-2}{}_{(aq)} \rightarrow (Mg/Ca/Fe)CO_{3(s)} \qquad \text{Equation 1,}$$

where the forms of alkaline-earth metal carbonates in their Earth forms are better known magnesite, calcite, and siderite, respectively.

Mafic minerals, which are useful in basalt compositions, such as basalt nanoparticle, comprising metals (for example, granite) may also provide silicates (for example, metal silicates, such as calcium silicates, aluminosilicates, and iron-bearing silicates) that contain at least one metal along with silicon. Upon introduction into a carbonic acid solution, such metal silicates may react with the acid as well as provide divalent cations that react with the bicarbonate ions to form the insoluble carbonate solid.

Pure and impure natural materials are useful in the inventive process and system. Naturally occurring materials comprising metal silicates, such as those present in mafic rocks, ultramafic rocks, granites, minerals, and mineral-rich clays, may be utilized as "basalts". Metal silicates include, but are not limited to, basalts comprising orthosilicates, inosilicates, phyllosilicates, and tectosilicates.

Orthosilicates include, but are not limited to, the olivine group minerals ($(Mg, Fe)_2SiO_4$). Olivine minerals richer in magnesium (that is, containing more forsterite ($Mg_2SiO_4$) provide more reactive divalent cations into aqueous solution than iron-rich olivine minerals (that is, those containing more fayalite ($Fe_2SiO_4$)); however, both minerals are useful for facilitating the embodiment processes.

Inosilicates ("chain silicates") include, but are not limited to, single chain inosilicates, such as pyroxene group minerals ($XY(SiAl)_2O_6$), where X represents ions of calcium, sodium, iron (for example, $Fe^{+2}$), and magnesium; and Y represents ions of smaller size, such as chromium, aluminum, iron (for example, $Fe^{+3}$ and possibly $Fe^{+2}$), magnesium, manganese, scandium, titanium, and vanadium,. Pyroxene group minerals richer in magnesium are useful, such as institute ($Mg_2Si_2O_6$). Ferrosilite ($Fe_2Si_2O_6$) is also a useful pyroxene material but generates less-reactive iron cations. Another example of single chain inosilicates may also include pyroxenoid group minerals, such as wollastonite ($CaSiO_3$). Wollastonite is commonly found in contact-metamorphosed limestone. Pectolite ($NaCa_2(Si_3O_8)(OH)$) is also another example that is useful. Useful double chain inosilicates may include, but are not limited to, amphibole group minerals, such as anthophyllite ($(Mg, Fe)_7Si_8O_{22}(OH)_2$).

Phyllosilicates (that is, sheet silicates) include, but are not limited to, the serpentine group minerals. Examples of serpentine minerals include antigorite, chrysotile, and lizardite polymorphs of serpentine ($(Mg, Fe)_3Si_2O_5(OH)_4$)), phyllosilicate clay minerals (for example, montmorillonite $(Na, Ca)_{0.33}(Al, Mg)_2(Si_4O_{10})(OH)_2$—$nH_2O$ and talc ($MgSi_4O_{10}(OH)_2$), and mica group minerals (for example, biotite $K(Mg, Fe)_3(AlSi_3O_{10})(F, OH)_2$).

Tectosilicates (that is, framework silicates) that are comprised of aluminosilicates are useful. Such tectosilicates include, but are not limited to, plagioclase feldspars, such as labradorite ($(Na, Ca)(Si, Al)_4O_8$ (Na:Ca 2:3) and anorthite ($CaAl_2Si_2O$), and members of the feldspathoid family, the scapolite group, and the zeolite family.

Other useful mafic minerals may be found in peridotite, greywacke, rhyolite, and andesite.

The oxidation state of the iron cation may affect its ability to neutralize the carbonate or bicarbonate anions present in the treatment fluid that are a product of the carbonic acid reaction with the basalt nanoparticle. The basalt nanoparticle may comprise a low iron comprising material. In one or more embodiments, the basalt nanoparticle may comprise less than 5% by weight iron.

Ultramafic minerals may comprise more than 18 wt. % magnesium oxide. Ultramafic minerals, along with being rich in magnesium and iron, may also contain a significant amount of silicates—up to about 45 wt % $SiO_2$. Some of the minerals presented previously in the mafic discussion would be classified as some in the subset of "ultramafic minerals".

Mafic and ultramafic rocks, which may comprise at least about 90% mafic or ultramafic minerals, are useful. Such rocks may include, but are not limited to, basalt pyroxenite, troctolite, dunite, peridotite, basalt, gabbro, diabase, and soapstone. Common rock-forming mafic minerals include, but are not limited to, olivine, pyroxene, amphibole, and biotite. Serpentine is an abundant naturally occurring mineral having minor amounts of elements like chromium, manganese, cobalt, and nickel. Serpentine as a class of rock may refer to 20 or more varieties of minerals belonging to the serpentine group that have high amounts of high purity mafic and ultramafic minerals. Another useful rock often found with high amounts of mafic and ultramafic minerals is olivine. Olivine is a naturally occurring magnesium-iron silicate (($Mg, Fe)2SiO_4$) dominated material. Olivine may have a compositional range from nearly pure forsterite ($MgSiO_4$) ("Fo") to fayalite ($Fe_2SiO_4$) ("Fa"). In one or more embodiment, olivine may have a molar ratio of forsterite to fayalite of 7 Fo:3 Fa. As per the previously discussion regarding the activity of iron cation, the more forsterite over fayalite present in olivine is desirable but certainly not required for being useful as part of embodiment processes. Other useful members of the olivine group include, but are not limited to, monticellite ($CaMgSiO_4$) and kirschsteinite ($CaFeSiO_4$). Wollastonite is a naturally occurring calcium silicate ($CaSiO_3$) with small impurities of iron, magnesium and manganese that occasionally substitute for the calcium ion, is also a useful basalt nanoparticle material.

A useful type of basalt for this process is Saudi Arabian basalt. A typical composition of Saudi Arabian basalt is provided for in Table 1:

TABLE 1 assay percentage ranges of several minerals found in a sample of Saudi Arabian basalt.

| Common Mineral Name | Percentage Range | Mineral Formula |
|---|---|---|
| Chlorite | 5-8% | $(Mg,Fe)_3(Si,Al)_4O_{10}(OH)_2 \cdot (Mg,Fe)_3(OH)_6$ |
| Smectite | 0-1% | $(Ca^{2+},Mg^{2+})_{0.33}Al_2(Si_{3.67}Al_{0.33})O_{10}(OH)_2$ |
| Illite/mica | 2.5-5% | $(K,H_2O)(Al,Mg,Fe)_2(Si,Al)_4O_{10}[(OH)_2,(H_2O)]$ |
| Kaolinite | 1-3% | $Al_2Si_2O_5(OH)_4$ |
| Quartz | 1-3% | $SiO_2$ |
| K feldspars | 0-1% | $KAlSi_3O_8$ |
| Plagioclase | 20-25% | $Ca_{0.70}Na_{0.30}Al_{1.70}Si_{2.30}O_8$ |
| Ilmenite | 0-1% | $FeTiO_3$ |
| Calcite | 1-3% | $CaCO_3$ |
| Dolomite | 1-5% | $CaMg(CO_3)_2$ |
| Siderite | 0-1% | $FeCO_3$ |
| Anhydrite | 1-4% | $CaSO_4$ |
| Barite | 0-3% | $BaSO_4$ |
| Halite | 0-1% | $NaCl$ |
| Pyrite | 0-1% | $FeS_2$ |
| Hematite | 0-6% | $Fe_2O_3$ |
| Hedenber | 1-4% | n/p |
| Dio/Augite | 20-25% | $(Ca,Na)(Mg,Fe,Al,Ti)(Si,Al)_2O$ |
| Clinopyro. | 3-7% | n/p |
| Olivine | 0-1% | $Fe_2Mg_8O_{20}Si_5$ |
| Prehnite | 25-35% | n/p |
| Analcime | 0-1% | $Na(AlSi_2O_6) \cdot H_2O$ | where "n/p" means "not provided". The analysis is to two significant digits. The analysis does not absolutely exclude minerals that do not show a presence even down to two significant digits; rather, these other minerals may be considered impurities.

In one or more embodiments, the purity of the basalt nanoparticle particles may be in the range of from about 50 to 100% by weight (wt. %), such as about or greater than 55 wt. %, such as about or greater than 60 wt. %, such as about or greater than 65 wt. %, such as about or greater than 70 wt. %, such as about or greater than 75 wt. % such as about or greater than 80 wt. %, such as about or greater than 85 wt. %, such as about or greater than 90 wt. %, such as about or greater than 95 wt. %, such as about or greater than 98 wt. %, such as about or greater than 99 wt. %, such as about or greater than 99.5 wt. %, and such as about or greater than 99.9 wt. %

In relation to purity of the basalt nanoparticle, the non-basalt portion of the basalt nanoparticle may be composed of an amount of material that is non-reactive in the acidic aqueous environment or does not facilitate the capture of carbon dioxide, for example, silicon oxide, and metal oxides, such as manganese oxide, and alkaline-earth metal carbonates, for example, calcium carbonate. Other non-reactive materials may include quartz and non-divalent cation producing materials. In one or more embodiments, the basalt nanoparticle may comprise less than 10 wt. % non-reactive materials, such as less than 5 wt. %, such as less than 3 wt. %, such as less than 2 wt. %, and such as less than 1 wt. %. In one or more embodiments, the basalt nanoparticle may comprise less than 10 wt. % carbonate materials. In one or more embodiments, the basalt nanoparticle may comprise less than 1 wt. % MnO.

In one or more embodiments, the basalt nanoparticle may further include an amount of basalt-like materials. For the purpose of this application, "basalt-like particles" are typically solid materials that may provide divalent ions of calcium, magnesium, iron, barium, and combinations thereof in an aqueous solution or release upon reaction with an aqueous acid, such as carbonic acid. Examples of such have been previously described, such as the presence of divalent cation chloride salts, for example, calcium chloride, magnesium chloride, barium chloride, and iron chloride. Once released into the aqueous environment, these may disassociate and create free divalent cations as previously described. Metal silicates may also be useful for introducing divalent ions. Although some of these salts and ions may naturally be present in water, as previously described, they may also be intentionally added to the water at the surface to supplement the ion concentration.

The basalt nanoparticle may have a size that is in the nanoparticle scale of size. In one or more embodiments, the basalt nanoparticle may have a size that is in a range of from about 1 to about 999 nanometers (nm). The basalt particles may take any geometric, such as spheroid, cuboid, or cubic, non-geometric, such as amorphous or "broken rock", and combinations thereof, form for introduction downhole. Utilizing basalt nanoparticle in the nanometer scale will ensure distribution of the basalt particles in the slurry during turbulent flow, mixing, and introduction into the injection formation. As well, the nanoparticle size may permit introduction of the solid basalt particles into tight formations, such as formations with porosities as low as 1% of the matrix volume, as will be further described. Finally, the small size maximizes surface area for the aqueous acid to interact with the basalt material of the basalt nanoparticle to form bicarbonate ions and free divalent alkaline-earth metal cations into the slurry.

In one or more embodiments, the treatment fluid comprises water. Water may comprise one or more known compositions of water, including, but not limited to, distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; boiler feed water; condensate water; and combinations thereof. The water may include impurities, including, but not limited to, ions, salts, minerals, polymers, organic chemicals, inorganic chemicals, detritus, flotsam, debris, and dead and living biological life forms, so long as the purpose and performance of the surfactant solution is not mitigated or otherwise detrimentally affected.

As previously described, the water provided may already include a natural or artificial concentration of useful divalent cations present in the fluid, such as by using a brine or seawater diluted with an amount of fresh water. One of ordinary skill in the art utilizing the present disclosure will be able to devise a combination of water and natural or synthetically-introduced cations for use in the disclosed embodiment systems and processes with a given basalt nanoparticle composition and amount.

In one or more embodiments, the treatment fluid also comprises a carbon dioxide fluid. Although there is no restriction on the phase of its introduction into the injection wellbore, the carbon dioxide fluid is likely introduced as a gas or a supercritical fluid unless it is partially or completely dissolved in another fluid, such as the treatment fluid.

In one or more embodiments, the treatment fluid does not comprise a carbon dioxide fluid. In some instances, as previously described, the treatment fluid and the carbon dioxide fluid are introduced into the injection wellbore and the injection formation separately.

In one or more embodiments, the purity of the carbon dioxide may be in the range of from about 50 to 100% by volume (vol. %), such as about or greater than 55 vol. %, such as about or greater than 60 vol. %, such as about or greater than 65 vol. %, such as about or greater than 70 vol. %, such as about or greater than 75 vol. %, such as about or greater than 80 vol. %, such as about or greater than 85 vol. %, such as about or greater than 90 vol. %, such as about or greater than 95 vol. %, such as about or greater than 98 wt. %, such as about or greater than 99 vol. %, such as about or greater than 99.5 vol. %, such as about or greater than 99.9 vol. %, and such as about or greater than 99.99 vol. %.

It is appreciated that the greater the carbon dioxide purity the more efficient the reaction; however, there may be instances where a person of ordinary skill may wish to utilize a "waste gas stream" from a refinery or from an enhanced oil recovery (EOR) process that may have a contaminant, such as a light hydrocarbon, carbon monoxide, nitrogen, or hydrogen sulfide, in which simultaneous sequestration is preferred.

In one or more embodiments, the carbon dioxide is introduced into the injection wellbore at a pressure that is about at atmospheric conditions. In one or more embodiments, the carbon dioxide is introduced into the injection wellbore at a pressure that is greater than atmospheric pressure but less than the critical pressure of carbon dioxide. The critical pressure value of carbon dioxide is about 72.8 atmospheres. In one or more embodiments, the carbon dioxide is introduced into the injection wellbore at a pressure that is at or greater than the critical pressure of carbon dioxide. At typical wellbore conditions, carbon dioxide introduced at or greater than the critical pressure will likely transition into a supercritical state because the critical point temperature of carbon dioxide is only 31.0° C. At the critical point or in the supercritical state, the properties of carbon dioxide change, especially its polarity, which helps increase the amount of carbon dioxide that may dissolve into the water of the treatment fluid.

Injection Formation

The composition of the injection formation may be of any material that is configured to receive and to permit traversal of a fluid, such as a formation comprised of limestone, sandstone, shale, and combinations thereof. The composition of the injection formation may be homogeneous or heterogeneous, that is, it may be a singular material or contain multiple materials in the same formation. In one or more embodiment, the injection formation comprises a non-basalt matrix material. In one or more embodiment, the injection formation consists essentially of a non-basalt matrix material. In one or more embodiment, the injection formation consists of a non-basalt matrix material.

The injection formation may also comprise at least a portion of a basalt, as previously described. In one or more embodiments, the injection formation may include basalt in a range of from about 0 to 100% by volume, such as about or greater than 50 vol. %, such as about or greater than 55 vol. %, such as about or greater than 60 vol. %, such as about or greater than 65 vol. %, such as about or greater than 70 vol. %, such as about or greater than 75 vol. %, such as about or greater than 80 vol. %, such as about or greater than 85 vol. %, such as about or greater than 90 vol. %, such as about or greater than 95 vol. %, such as about or greater than 98 wt. %, such as about or greater than 99 vol. %, such as about or greater than 99.5 vol. %, such as about or greater than 99.9 vol. %, and such as about or greater than 99.99 vol. %.

For formations being injected into (rather than those like a cavern where the fluids are fully contained), the permeability of the formation permits migration of the reaction materials through the formation. In one or more embodiments, the permeability of the formation is in a range of from about 0.001 mD (milidarcy) to 100,000,000 D (darcy).

The injection formation has a porosity. The porosity is the pore volume or void volume to the total volume of a porous material, where the pore or void volume represents not only porous spaces and connectivity between but also other heterogeneities, including vugs, fractures, and faults. Estimating, determining, or approximating the pore volume for an injection formation is on a case-by-case basis, and may utilize formation samples as well as computer models and experience. Techniques are well established in the industry for those of ordinary skill in the art of formation treatment and production management. In one or more embodiments, the porosity of the formation may be in a range of from about 1 to 50 vol. %.

In one or more embodiments, the injection formation may have a fluid presented in the matrix of the formation. In such instances, the fluid may be at a low or depleted pressure. A "depleted" pressure means that the pressure within the injection formation is insufficient to drive the fluid within the reservoir to surface through the injection wellbore even if permitted to do so (formation to surface differential pressure is less than fluid head pressure). Such a condition may have been achieved naturally or using artificial drive means (for example, electrical submersible pumps). Regardless, there may reside still under some pressure fresh, mineral, seawater or brine, reinjected production, or other formation waters; solid, liquid, or gaseous hydrocarbons; hydrogen sulfide; hydrogen; noble gases; and carbon dioxide.

In one or more embodiments, the injection formation may have had a prior physical or chemical treatment applied to it, such as to remove impurities, water, hydrocarbons, or other minerals previously present. As such, the injection formation may have been physically modified, chemically modified, or have a fluid of some sort residing in at least part of its pore space. In one or more embodiments, the injection formation may have had a water flood applied to it. In one or more embodiments, the injection formation may have had a surfactant flood applied to it. In one or more embodiments, the injection formation may have had a polymer flood applied to it. In one or more embodiments, the injection formation may have had a carbon dioxide flood applied to it. In one or more embodiments, the injection formation may have had a water-alternating-fluid flood, such as a gas (WAG), a surfactant (WAS), or a polymer (WAP), applied to it. In one or more embodiments, the injection formation may have had a surfactant-alternating-gas (SAG) flood applied to it. In one or more embodiments, the injection formation may have been fracked such that there are primary and possibly secondary fissures accessible by the injection wellbore. In one or more embodiments, the injection formation may have been treated with an acid or matrix acidified such that there are wormholes or other dissolved portions of the formation accessible by the injection wellbore. In one or more embodiments, the injection formation may have been treated such that the formation is water-wet, that is, such that it has a water surface contact angle less than 90°. Other chemical and physical treatments of the injection formation may be envisioned by one of ordinary skill in the art.

Well System

In one or more embodiments, the well system may include an injection wellbore having a configuration such that it traverses an injection formation. The well system may have an injection wellbore that is configured as a vertical, approximately vertical, deviated, approximately horizontal, horizontal, and combinations thereof. For example, in FIGS. 1-4 the injection wellbores are shown to have a vertical portion, at least one transition to a deviated portion (the bend or elbow), and at least one portion that is a horizontal lateral. In fact, in FIGS. 1-4 all four well systems show injection wellbores having a plurality of horizontal laterals. Such configurations of the injection wellbore are well appreciated by a person of ordinary skill in the art.

In one or more embodiments, the well system may be configured such that the injection wellbore has a single-lateral horizontal configuration. In one or more embodiments, the well system may be configured such that the injection wellbore has a multi-lateral horizontal configuration. The injection wellbores of FIGS. 1-3 show a multi-lateral horizontal well configuration, where two horizontal portions branch from a mother wellbore in different directions around a similar depth. In one or more embodiments, the well system may be configured such that the injection wellbore has a multi-level horizontal configuration. The injection wellbore of FIG. 4 shows a multi-level lateral horizontal well configuration, where the two horizontal laterals branch from a mother wellbore in the same direction at different depths and run effectively parallel to one another. Such a configuration may be utilized to exploit differences in buoyancy between two fluids, such as the treatment fluid, which is aqueous, and the CO2 fluid, which is typically more buoyant than aqueous fluids. Such as multi-level horizontal well configuration may also be utilized for natural or forced-gravity drainage.

One or more embodiments of the well system may be configured to introduce fluids, such as the treatment fluid and the CO2 fluid, into the injection formation from the surface. As well, the well system may also be configured to receive fluids from the injection formation, such as resultant fluids from the reaction of basalt materials and aqueous carbonic acid. The well system may convey fluids into and out of the injection wellbore utilizing one or more fluid supply lines, such as the treatment fluid supply line shown in FIGS. 1-4, that may run between the injection zone and the surface. The treatment fluid flow into and out of a treatment zone as well as along the wellbore may be selective by utilizing inflow control valves (ICVs), electrical submersible pumps (ESPs)—either in the normal or inverted configuration, and surface pumps and valves. Such selective manipulation of fluid flow pathways through the well system may be modified manually, utilizing pre-set instructions and algorithmic determinations made by a computer processor, or both.

In one or more embodiments, the well system is configured such that the treatment fluid and the CO2 fluid are introduced into the injection wellbore using a single fluid line. For example, in FIG. 1, a single fluid conduit is shown introducing the treatment fluid, which also contains CO2 fluid. In one or more embodiments, the well system is configured the treatment fluid and the CO2 fluid are introduced into the injection wellbore using separate fluid lines. For example, in both FIGS. 2 and 4 a first injection line introduces treatment fluid without CO2 fluid into the injection wellbore and a second injection line introduces CO2 fluid into the injection wellbore.

In one or more embodiments, the well system is configured such that the treatment fluid and the CO2 fluid are introduced into the same treatment zone. For example, in FIG. 1 the treatment fluid and the CO2 fluid are combined on the surface and introduced into the well system together. In another example, in both FIGS. 2 and 3, the treatment fluid and the CO2 fluid are introduced separately into the well system and then are combined into a single injection line downhole. A mixer, a sparger, a "tee" or other means of mixing two fluids together is utilized to permit the two fluids to intimately intermingle and be introduced together into the treatment zone.

In one or more embodiments, the well system is configured such that the treatment fluid and the CO2 fluid are not introduced into the same treatment zone. FIG. 4 shows a configuration of the well system such that a first injection line conveys treatment fluid into an upper lateral for distribution of treatment fluid into the upper portion of the injection formation. A second injection line conveys CO2 fluid into a lower lateral for distribution of CO2 fluid into the lower portion of the injection formation. The treatment fluid and the CO2 fluid only interact in the injection formation—not before.

In one or more embodiments, the well system is configured such that there is a treatment zone positioned in a horizontal portion of the injection wellbore. Each treatment zone comprises an uphole and downhole annular packer that fluidly isolates the wellbore annulus within the treatment zone from uphole and downhole of the injection wellbore. An injection line passes through each uphole annular packer associated with a treatment zone. In one or more embodiments, a control signal line may also pass through each uphole annular packer associated with a treatment zone. Each annular packer couples to the exterior of the injection line such that fluid may not bypass in between the annular packer and the injection line. Each annular packer also couples to the interior of the wellbore wall of the horizontal portion of the injection wellbore such that fluid may not bypass in between the annular packer and the wellbore wall. It is envisioned that an individual annular packer may be shared between two adjacent treatment zones, such as an uphole treatment zone having a downhole annular packer and a downhole treatment zone having an uphole annular packer that is the same packer.

In one or more embodiments, each treatment zone includes a treatment unit. The treatment unit is coupled to and in fluid communication with an injection line. In one or more embodiments, the treatment unit is configured to receive a fluid from the injection line and to selectively distribute the fluid into the treatment zone. From the treatment zone, the fluid further traverses into the injection formation. For example, the treatment unit may comprise an injection control device (ICD), such as shown in both insets of FIGS. 1 and 2. In some instance, the ICDs may be specialized to distribute one type of fluid, such as a treatment fluid, which may be a suspension or a slurry, or a CO2 fluid, such as a gas or a critical or supercritical fluid. For example, the first treatment units of FIG. 4 may be configured to only handle the liquid-dominated suspension or slurry of the combination of water and basalt nanoparticles, whereas the second treatment units of FIG. 4 may be configured to handle only the CO2 fluid, whether it be in gaseous, liquid, critical, or supercritical state. In one or more embodiments, the treatment unit is configured to handle a treatment fluid where the treatment fluid comprises basalt nanoparticle, water, and a CO2 fluid.

In one or more embodiments, the treatment unit may also be configured to receive a fluid from the treatment zone and pass the fluid into the injection line. In such a case, the ICD may further be an inflow and injection control device (IICD) to permit fluid flow both into and out of the device.

The treatment unit is configured to receive and respond to a control signal from the surface to modify its operating state. In one or more embodiments, the treatment unit is coupled to and in signal communication with a control signal line. For example, a control signal to modify the operating state of the treatment unit may open the ICD. When an ICD is in the open position, fluid is capable of being produced from the piping or line providing treatment fluid or CO2 fluid into a treatment zone and further into the injection formation. As well, depending on how the well system is being operated at the time, fluid may also be capable of being received into the pipeline or line from the annular portion of a treatment zone and the injection formation, such as for flowback testing. A control signal may modify the operating state of the treatment unit to close the ICD. When an ICD is not in the open position, that is closed, the opposite occurs—no fluid is capable of being produced from the piping or line providing treatment fluid or CO2 fluid. As well, no fluid is capable of being received into the pipeline or line from the portion of the wellbore annulus or injection formation. The state of the IICD may be controlled through an appropriate command signal, such as one conveyed through the signal control line from the well control system as provided in FIGS. 1-4. Other means of controlling the IICDs in the treatment zone are known to a person of ordinary skill in the art and are envisioned.

In one or more embodiments, a treatment unit may further include a sensor that is configured to detect a condition in the treatment zone. An example is provided in FIG. 1, especially at the inset (sensor package 1080). The sensor may include one of a variety of types of sensors that are configured to detect a condition in the treatment zone, such as, but not limited to, pressure, temperature, pH, composition, resistivity, density, and conductivity. Detected values from a sensor may be communicated uphole utilizing a coupled signal line or by other means as known in the art with communicating with the surface, such as by fluid telemetry. The coupled signal line may be coupled with a computer processor configured to interpret such signals utilizing pre-programmed instructions and to then provide command signals to cause operation of other devices, such as the downhole batch reactor or the ICDs. With such information detected by the sensor package, the well control system may make one or more automated determinations and relay one or more automated command signals to one or several treatment units in one or more embodiments, such as adjusting treatment fluid flow or turning an acoustic transmitter on or off.

In one or more embodiments, the sensor associated with the treatment unit may be a carbon dioxide concentration sensor. In one or more embodiments, the sensor associated with the treatment unit may be a pH sensor. Utilizing a carbon dioxide concentration sensor, especially one configured to detect carbon dioxide concentration in an aqueous medium, may be useful in determining not only the amount of carbon dioxide introduced into the injection formation from a target zone but also determine the concentration of carbon dioxide, if any, in any fluid that flows back into the target zone from the injection zone during routine testing. Doing a "flowback test" and detecting free carbon dioxide (or lack thereof) may indicate the extent of the carbonate formation reaction that is occurring in the injection formation. Similarly, a pH sensor attuned to carbonic acid, bicarbonate ions, and carbonate ions, may also permit the determination of the extent of the reaction occurring during a flowback test. Detection of bicarbonate and carbonate ions and a lack of dissolved carbon dioxide in a treatment fluid being introduced into the formation may indicate reactions with the basalt nanoparticles occurring in the injection fluid line, which may foretell potential scale buildup in the injection lines that may need to be treated.

In one or more embodiments, a treatment unit includes an acoustic unit that is configured to transmit an audio signal into the injection formation. An example is provided in FIG. 2, especially at the inset (acoustic package 2082 broadcasting acoustic waves 2084). The reaction between carbonic acid formed in the treatment fluid and the basalt nanoparticle (and potentially reactive portions of the injection formation) may be accelerated or stimulated when influenced by acoustic energy transmitted into the injection formation. The acoustic waves traversing the injection formation stimulates motion in not only the matrix material but also in the fluids, such as the aqueous solution and the carbon dioxide, and the free solids, such as the basalt nanoparticles. The energy conveyed into the injection formation helps to accelerate the carbonate formation reaction and to keep carbon dioxide dissolved in the aqueous solution, where it may convert into carbonic acid and react. Variables, such as the formation material, porosity, thickness of injection formation, the concentration of carbon dioxide or basalt nanoparticles introduced, may affect the frequency utilized to stimulate the reaction in the injection formation. The frequency, power, and the periods of transmission may be controlled utilizing a coupled control signal line or by other means as known in the art with communicating with the device.

The audio frequency that is utilized in stimulating the reaction in the injection formation may vary. In one or more embodiments, the frequency of transmission from the acoustic unit may be in an ultrasonic frequency range. Ultrasonic frequency is appreciated to be in a range of from about 20 kHz (kilohertz) to several gigahertz. In one or more embodiments, the frequency of transmission from the acoustic unit may be in the sonic frequency range. The sonic frequency range, also known as the audible frequency range, is appreciated to be in a range of from about 20 Hz (Hertz) to about 20 kHz. In one or more embodiments, the frequency of transmission from the acoustic unit may be in the infrasonic frequency range. Infrasonic frequencies are appreciated to be in a range of from about 0.001 Hz to about 20 Hz.

In one or more embodiments, the well system may include a batch reactor. Previously described regarding FIGS. 1-4 is a surface slurry mixer that mixes water with basalt nanoparticles to create an aqueous slurry; however, in the embodiments akin to the well system 3000 of FIG. 3 may include a batch reactor or batch-like reactor, like a CSTR (continuously stirred tank reactor) (together "batch reactor"), positioned in a subterranean portion of the well system. Because injection formations may lie thousands of feet underground and the horizontal portion of the well may be an additional thousands of feet in length, the purpose of the batch reactor is to ensure that the water and the basalt nanoparticles, remain incorporated with one another and well-distributed at the point just before introduction into the injection formation. At the final vertical depth, the increased head pressure and the mixing may increase the incorporation of the carbon dioxide into the water phase and start the carbonic acid formation process.

In configurations of the well system where the batch reactor is a non-continuous such that there are separate periods of fluid introduction/discharge and mixing, sets of ESPs and ICVs may be positioned both uphole of the fluid inlet and downhole of the fluid outlet of the batch reactor to selectively introduce into and discharge fluids from the batch reactor. In configurations of the well system where the batch reactor is a continuous such that there are not separate periods of fluid introduction/discharge and mixing, such as with a CSTR, configurations utilizing ESPs and ICVs may still be utilized, although the directing of fluid into and from the CSTR may be governed by fluid injection pumps or systems on the surface. Such selective pumping and routing of fluids to be mixed downhole may be coordinated manually, handled automatically through a set of pre-determined instructions and algorithms utilized by a computer processor in signal communications and controlling the actions of such utilizing incoming detected signals and outgoing command signals to appropriate units, such as valve position, pump status, and mixer operation, or a combination thereof.

Although describe in context of utilizing a batch reactor, one of ordinary skill in the art may recognize that combinations of ESPs, ICVs, and both ESPs and ICVs may be utilized to selectively route fluid that is to be selectively introduced into the treatment zone into one, some, or all of the horizontal portions of the injection wellbore. That is, it is envisioned that the treatment fluid may be purposefully routed to one horizontal portion of a wellbore and not anther at a give time, for example, to permit a portion of the injection formation to undergo isolation or fluid backflow testing, which another portion of the injection formation undergoes active introduction of treatment fluid.

Additional supporting equipment for embodiments of the system may include additional standard components or equipment that enables and makes operable the described apparatuses, processes, methods, systems, and compositions of matter. Examples of such standard equipment known to one of ordinary skill in the art includes, but are not limited to, heat exchanges, blowers, single and multi-stage compressors and pumps, separation equipment, manual and automated control and isolation valves, switches, analogue and computer-based controllers, and pressure-, temperature-, level- flow-, and other-sensing devices.

Method of Use

Figure 5:
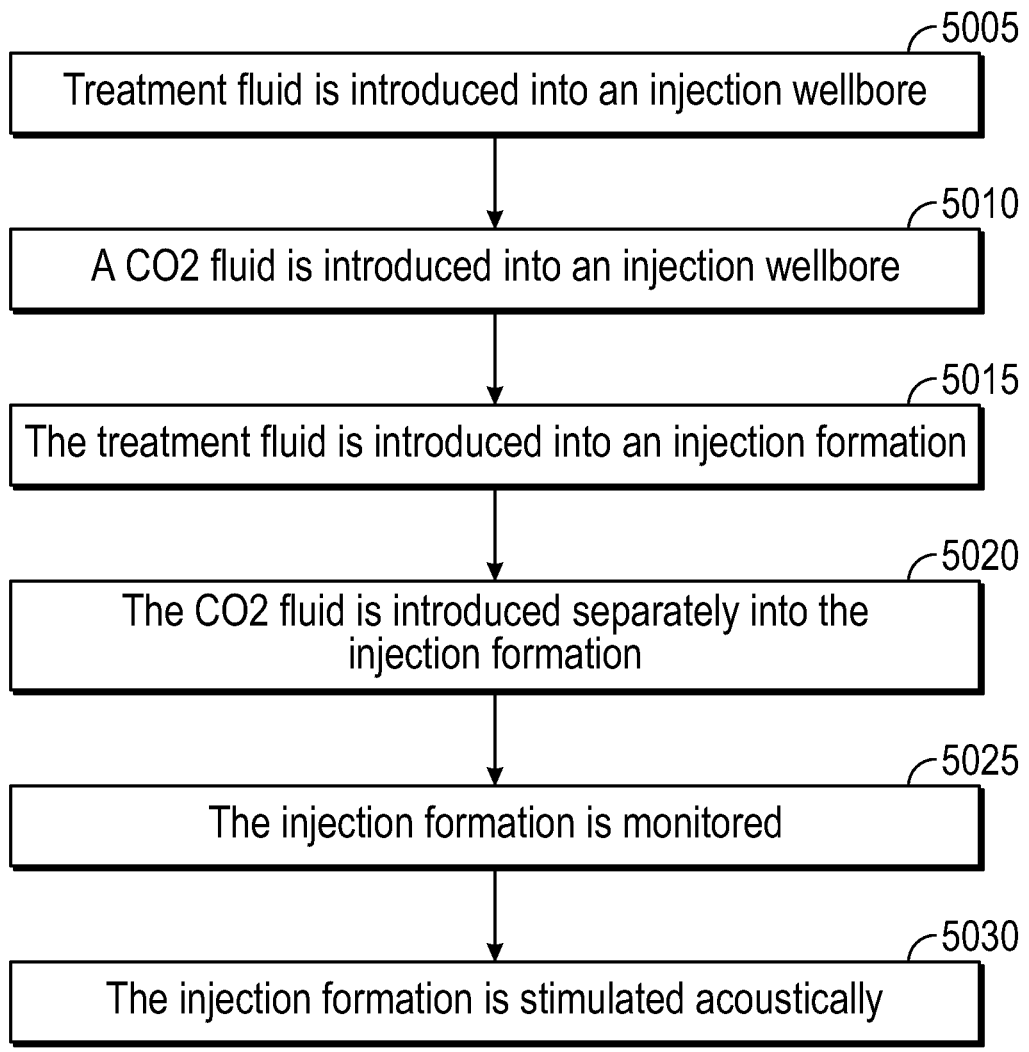
FIG. 5 is a flowchart that illustrates a method of treating an injection formation in accordance with one or more embodiments Specific embodiments of the disclosure will now be described in detail with reference to the accompanying figures. Other aspects and advantages of this disclosure will be apparent from the following description made with reference to the accompanying drawings and the appended claims.

FIG. 5 is a flowchart that illustrates a method of treating an injection formation in accordance with one or more embodiments. The injection formation may comprise a non-basalt material or may include basalt. The injection formation may be configured as a single lateral well, a multi-lateral well, or a multi-level well.

In a method of treating an injection formation, in one or more embodiments a treatment fluid is introduced into an injection wellbore. In method 5000 of FIG. 5, step 5005 shows that treatment fluid is introduced into an injection wellbore.

In a method of treating an injection formation, in one or more embodiments a CO2 fluid is introduced into an injection wellbore. In method 5000 of FIG. 5, step 5010 shows that a CO2 fluid is introduced into an injection wellbore. In one or more embodiments, the treatment fluid and the CO2 fluid are introduced into the injection wellbore through a single line. In one or more embodiments, the treatment fluid and the CO2 fluid are introduced into the injection wellbore though separate lines.

As previously described, in one or more embodiments the treatment fluid and the CO2 fluid may be combined in the injection wellbore utilizing a mixer or a sparger. This is to take advantage of the greater fluid pressure downhole, where carbon dioxide in liquid or gas form will convert into a critical or supercritical fluid. Critical and supercritical carbon dioxide dissolves in greater amounts than non-critical carbon dioxide; therefore, mixing carbon dioxide with water while in the critical or supercritical state may help to generate more carbonic acid in the treatment zone and the injection formation.

In a method of treating an injection formation, in one or more embodiments a treatment fluid is introduced into an injection formation. In method 5000 of FIG. 5, step 5015 shows that a treatment fluid is introduced into an injection formation.

In instances where in one or more embodiments carbon dioxide is not introduced into the injection formation as part of the treatment fluid, the CO2 fluid is introduced separately. In method 5000 of FIG. 5, step 5020 shows that a CO2 fluid is being introduced separately from the treatment fluid into an injection formation.

In one or more embodiments, the treatment fluid comprises basalt nanoparticles, water, and CO2 fluid. FIGS. 1 to 3 show treatment fluid comprising basalt nanoparticles, water, and CO2 fluid being introduced together as a treatment fluid 1070, 2070, and 3070, respectively. In one or more embodiments, the treatment fluid comprises basalt nanoparticles and water but not CO2 fluid. An example is shown in FIG. 4, where CO2 fluid 4071 is introduced separately into the injection formation from treatment fluid 4070A.

In a method of treating an injection formation, in one or more embodiments the injection formation is monitored. In method 5000 of FIG. 5, step 5025 shows that the injection formation is monitored. The injection formation and the progress of the carbonation reaction may be monitored as previously described, such as by initiating flowback into the treatment zone and detecting pH or carbon dioxide concentration levels in the fluid. The wellbore wall in fluid contact with the injection formation in the treatment zone may also be inspected utilizing known techniques for signs of corrosive damage, such as by carbonic acid matrix acidification, or deposition of carbonates at the face of the injection formation. Distributed acoustic sensing (DAS) and distributed temperature sensing (DTS) may be utilized to track the progress of the reaction. As well, chemical, radioactive, or physical (nanoparticle) tracers may be utilized to monitor the basalt conversion. For example, a non-reactive nanoparticle tracer may be incorporated into the matrix of a basalt nanoparticle. Upon a certain level of degradation of the basalt nanoparticle, the non-reactive nanoparticle tracer may be released and detected in a formation fluid flowback test.

In a method of treating an injection formation, in one or more embodiments the injection formation is stimulated acoustically. In method 5000 of FIG. 5, step 5030 shows that the injection formation is simulated acoustically. Acoustic waves may be transmitted into the injection formation such that the carbonation reaction is stimulated, and carbon dioxide (in the aqueous form of carbonic acid) is neutralized into sparingly soluble carbonates by reaction with the basalt nanoparticles or with injection formation matrix material that is reactive with carbonic acid. In one or more embodiments, the acoustic signal may be selected from an ultrasonic, a sonic, or an infrasonic frequency. In one or more embodiments, the transmission may be selected from continuous, periodic, or random pattern. In one or more embodiments, the transmission may be utilized to produce dissidence within the formation. In one or more embodiments, the transmission may be utilized to provide a harmonic within the formation.

In one or more embodiments, a frequency for stimulation of the injection formation is determined. For example, steps may include obtaining a sample of the injection formation and determining a resonant frequency for the injection formation sample.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

"Optionally" and all grammatical variations thereof as used refers to a subsequently described event or circumstance that may or may not occur. The description includes instances where the event or circumstance occurs and instances where it does not occur.

The term "substantially" and all grammatical variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed is:

1. A well system comprising:
an injection wellbore traversing an injection formation;
a treatment zone provided in a horizontal portion of the injection wellbore, where the treatment zone is in fluid communication with the injection formation;
a treatment fluid and a CO2 fluid both in fluid communication with the injection wellbore, where the treatment fluid comprises water and basalt nanoparticles; and
a treatment unit provided in the treatment zone, wherein the treatment unit is configured to selectively release at least one of the treatment fluid and the CO2 fluid into the treatment zone, and wherein the treatment unit includes an acoustic unit that is configured to transmit an audio signal into the injection formation at a frequency and power to stimulate a reaction between CO2 and the basalt nanoparticles.

2. The well system of claim 1 where the injection formation comprises a non-basalt matrix material.

3. The well system of claim 2 where the non-basalt matrix material is selected from the group consisting of limestone, sandstone, shale, and combinations thereof.

4. The well system of claim 1 where the injection wellbore has a multi-lateral horizonal configuration.

5. The well system of claim 1 where the injection wellbore has a multi-level horizonal configuration.

6. The well system of claim 1 where the treatment fluid and the CO2 fluid are in fluid communication with the injection wellbore via a single fluid line.

7. The well system of claim 1 where the treatment fluid and the CO2 fluid are introduced into the same treatment zone.

8. The well system of claim 1 where the treatment unit includes a sensor that is configured to detect a condition in the treatment zone.

9. The well system of claim 1, wherein the acoustic unit is configured to transmit in the infrasonic frequency range.

10. The well system of claim 1, further comprising a batch reactor that is positioned in the injection wellbore uphole from and in selective fluid communication with the treatment unit, wherein the batch reactor is configured to receive and selectively introduce the treatment fluid and the CO2 fluid into the treatment unit.

11. The well system of claim 10 where the batch reactor is a continuously stirred tank reactor (CSTR).

12. A method or treating an injection formation, comprising:
introducing a treatment fluid into an injection well traversing the injection formation;
selectively introducing the treatment fluid into a treatment zone in the injection wellbore, where the treatment zone is in fluid communication with the injection formation, and where the treatment fluid comprises water, basalt nanoparticles, and a CO2 fluid;
stimulating the injection formation acoustically, where the injection formation is stimulated acoustically by transmitting an infrasonic signal from the treatment zone into the injection formation to stimulate a reaction between CO2 and the basalt nanoparticles; and monitoring the injection formation.

13. The method of claim 12 where the injection formation comprises a non-basalt matrix material.

14. The method of claim 12 where the treatment fluid further comprises a basalt-like particle.

15. The method of claim 12 where the injection formation is monitored by flowing back a fluid from the injection formation and detecting a pH level of the fluid.

16. The method of claim 12 where the injection formation is monitored by flowing back a fluid from the injection formation and detecting a carbon dioxide concentration level of the fluid.

17. The method of claim 12 where before selectively introducing the treatment fluid into the treatment zone the treatment fluid is mixed in a batch reactor, where the batch reactor is positioned in the injection wellbore.

* * * * *